(12) United States Patent
Rimbey et al.

(10) Patent No.: US 10,194,741 B2
(45) Date of Patent: Feb. 5, 2019

(54) DIATOMACEOUS EARTH FILTER CLEANER

(71) Applicants: Alex Rimbey, Spencer, NY (US); Jerid Rimbey, Spencer, NY (US)

(72) Inventors: Alex Rimbey, Spencer, NY (US); Jerid Rimbey, Spencer, NY (US)

( * ) Notice: Subject to any disclaimer, the term of this patent is extended or adjusted under 35 U.S.C. 154(b) by 336 days.

(21) Appl. No.: 15/083,380

(22) Filed: Mar. 29, 2016

(65) Prior Publication Data

US 2017/0282103 A1 Oct. 5, 2017

(51) Int. Cl.
*B01D 41/04* (2006.01)
*A46B 13/00* (2006.01)
*B08B 1/00* (2006.01)
*A46B 9/02* (2006.01)
*B01D 29/52* (2006.01)
*B08B 1/02* (2006.01)
*B08B 3/10* (2006.01)
*B08B 9/00* (2006.01)
B01D 29/64 (2006.01)
B08B 9/023 (2006.01)

(52) U.S. Cl.
CPC .............. *A46B 13/001* (2013.01); *A46B 9/02* (2013.01); *B01D 29/52* (2013.01); *B01D 41/04* (2013.01); *B08B 1/002* (2013.01); *B08B 1/02* (2013.01); *B08B 3/10* (2013.01); *B08B 3/102* (2013.01); *B08B 9/00* (2013.01); *A46B 2200/3073* (2013.01); *B01D 29/6423* (2013.01); *B01D 2201/0446* (2013.01); *B08B 9/023* (2013.01)

(58) Field of Classification Search
CPC .... B01D 41/04; B01D 29/52; B01D 29/6423; B01D 2201/0446; B08B 1/002; B08B 3/10; B08B 3/102; B08B 9/00; B08B 1/02; B08B 9/023; A46B 9/02; A46B 13/001; A46B 2200/3073
See application file for complete search history.

(56) References Cited

U.S. PATENT DOCUMENTS 3,224,029 A * 12/1965 Domingos ............. A63B 60/36
                                                15/104.04
3,820,552 A *  6/1974 Lang et al. ............ B01D 29/21
                                                134/113
4,417,596 A * 11/1983 Pahlen ..................... B08B 9/00
                                                134/152
6,709,581 B2 * 3/2004 Leckal ................... B01D 29/62
                                                134/137

* cited by examiner

*Primary Examiner* — Matthew O Savage
(74) *Attorney, Agent, or Firm* — Brown & Michaels, PC

(57) ABSTRACT

A diatomaceous earth filter cleaner for cleaning flex tubes attached to a tube sheet of a diatomaceous earth filter. The diatomaceous earth filter cleaner has a hollow tube, a blast jet housing, an inner diameter scrub brush, and a fitting at an end of the hollow tube for coupling a hose connected to a water supply. The hollow tube of the diatomaceous earth filter cleaner has a length with a first end and a second end for receiving a flex tube. The blast jet housing is attached to the first end of the hollow tube and comprises an angled lip and a restricted orifice formed by an inner circumference of the blast jet housing for receiving a flex tube. The inner diameter scrub brush is received within the inner circumference of the blast jet housing and has an orifice for cleaning an outer circumference of the flex tube.

13 Claims, 6 Drawing Sheets

DIATOMACEOUS EARTH FILTER CLEANER

BACKGROUND OF THE INVENTION

Field of the Invention

The invention pertains to the field of filter cleaners. More particularly, the invention pertains to a diatomaceous earth filter cleaner.

Description of Related Art

Hayward Industries brand diatomaceous earth filters can be difficult to clean and often require the use of a diatomaceous earth degreaser and professional service, which can be expensive.

SUMMARY OF THE INVENTION

A diatomaceous earth filter cleaner for cleaning flex tubes attached to a tube sheet of a diatomaceous earth filter. The diatomaceous earth filter cleaner has a hollow tube, a blast jet housing, an inner diameter scrub brush, and a fitting at an end of the hollow tube for coupling a hose connected to a water supply. The hollow tube of the diatomaceous earth filter cleaner has a length with a first end and a second end for receiving a flex tube. The blast jet housing is attached to the first end of the hollow tube and comprises an angled lip and a restricted orifice formed by an inner circumference of the blast jet housing for receiving a flex tube. The inner diameter scrub brush is received within the inner circumference of the blast jet housing. The inner diameter scrub brush has an orifice for cleaning an outer circumference of the flex tube. When water is supplied from the hose to the hollow tube containing a flex tube, the water and the inner diameter scrub brush clean the outer circumference of the flex tube.

DETAILED DESCRIPTION OF THE INVENTION

Figure 1:
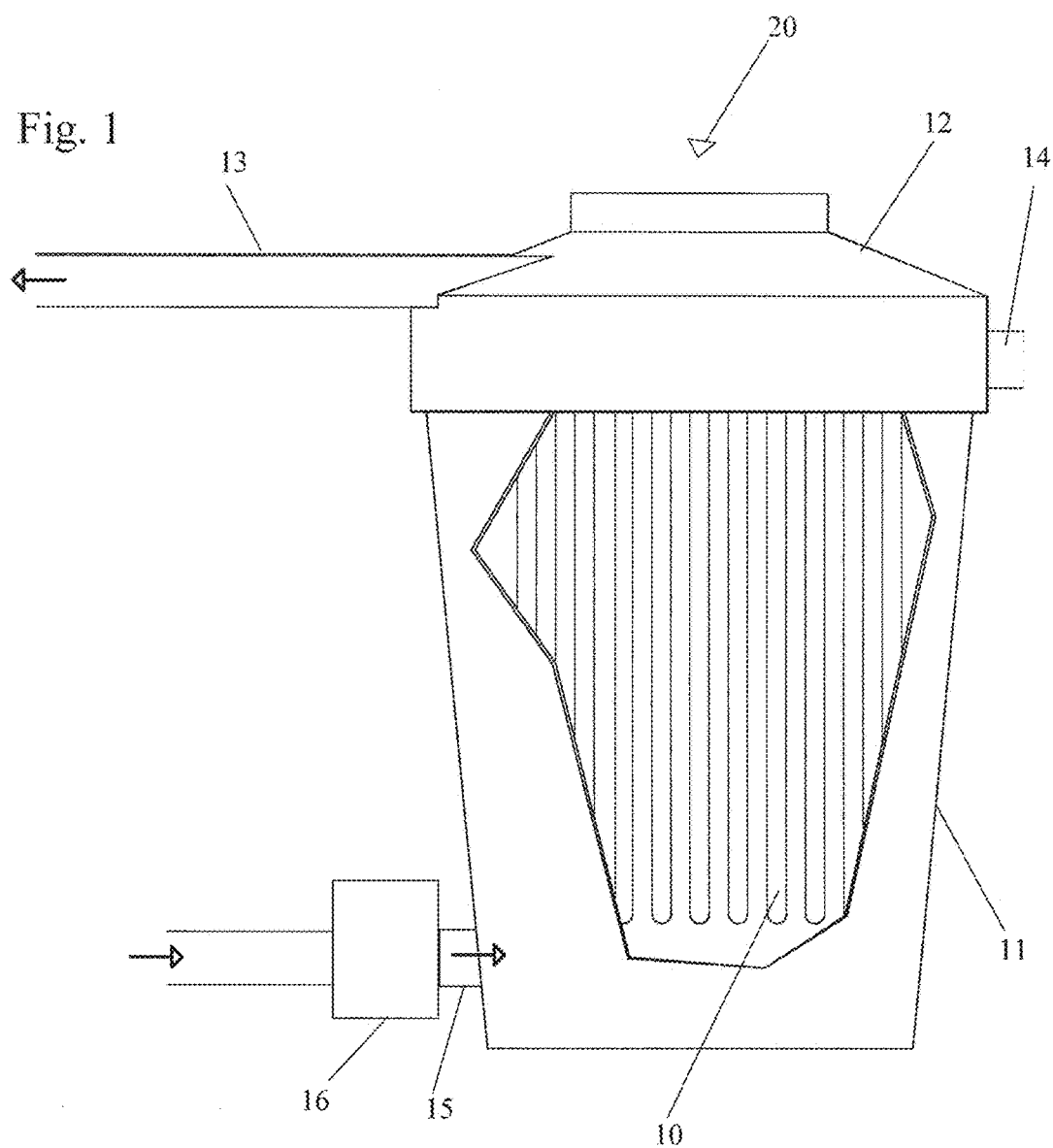
FIG. 1 shows a diatomaceous earth filter with a cutout showing the diatomaceous earth flex tubes.
Figure 2:
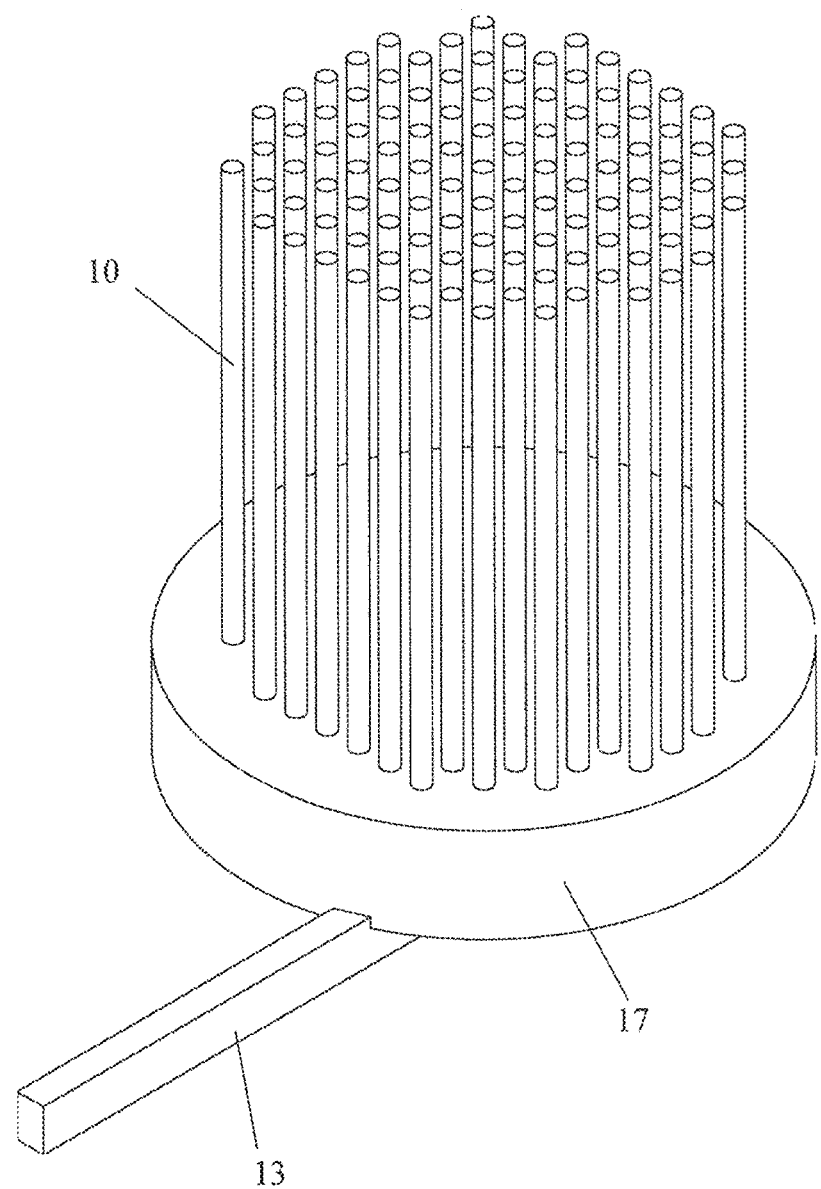
FIG. 2 shows the arrangement of the diatomaceous earth flex tubes with the filter housing removed.

FIGS. 1-2 show a diatomaceous earth filter with a plurality of flex tubes 10. The diatomaceous earth filter 20 is used in conjunction with a pool or other body of water that requires clear, filtered water. The diatomaceous earth filter 20 has the ability to filter out microscopic particles. The diatomaceous earth filter 20 has a hollow upper filter housing 12 removably attached to a hollow lower filter housing 11. The lower filter housing 11 has a connection 15 to a pump 16 which delivers unfiltered water from the pool or body of water to the diatomaceous earth filter 20. The connection 15 is also connected to a mixing chamber (not shown) within the lower filter housing 11. The lower filter housing 11 may also contain a pressure gauge (not shown) and a check valve (not shown) for preventing backflow.

The upper filter housing 12 contains a vent or an air relief valve 14 and a connection 13 to the pool to supply filtered water. The upper filter housing 12 receives a tube sheet 17 which has a plurality of flex tubes 10 attached. The flex tubes 10 each have a length which extends a length into the hollow lower filter housing 11. The flex tubes 10 are filter elements that efficiently reuse diatomaceous earth filter media and dirt mixture forming a fresh filtering surface. Each of the flex tubes 10 are covered in a fabric on which the diatomaceous earth forms a coating. The diatomaceous earth acts as a filter by permitting water to filter through the diatomaceous earth and leave the impurities behind.

Unfiltered water from the pool or other body of water is pumped into the diatomaceous earth filter 20 through a pump connection 15, mixed and circulated upwards through the flex tubes 10 to remove any debris or particulates, and returned to the pool as filtered water through connection 13.

With the constant removal of debris and particulates, the flex tubes need to be cleaned in order to extend their life and maintain their efficiency.

Figure 3:
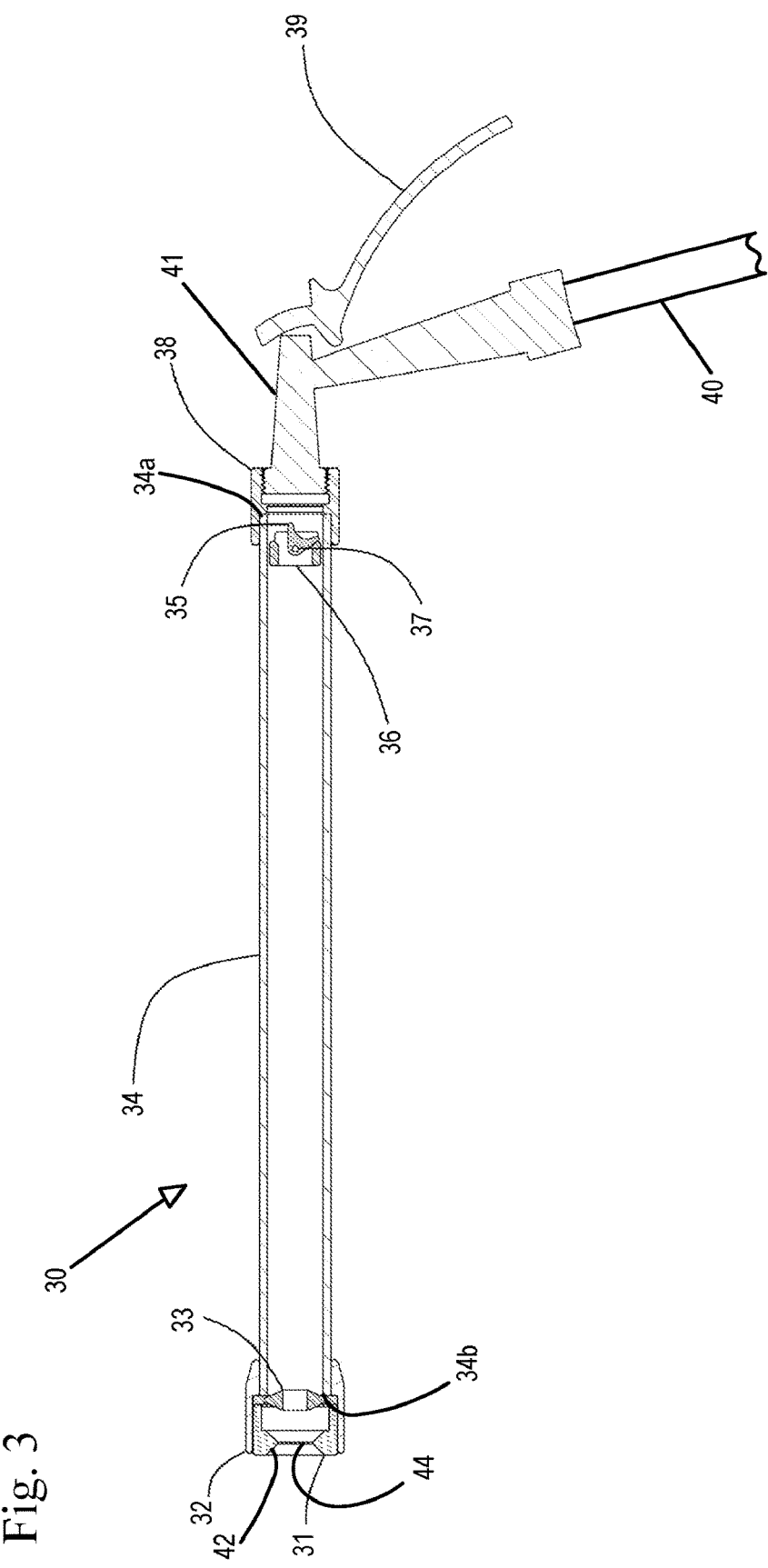
FIG. 3 shows a cross-section of a diatomaceous earth flex tube cleaner.

FIG. 3 shows a cross-section of a diatomaceous earth flex tube cleaner 30. The diatomaceous earth flex tube cleaner 30 has a tube 34 of a length with a first end 34a and a second end 34b.

The first end 34a has a hose or nozzle fitting 38 on an outer circumference of the tube 34 for receiving a water hose 40 or hose nozzle head 41. The nozzle fitting 38 preferably provides a water tight fit between the tube 34 and the water hose 40 or the hose nozzle head 41.

In one embodiment, the hose nozzle head 41 is used and the hose nozzle head 41 is secured to the water hose 40, with water from the water hose 40 flowing through the hose nozzle head 41 to the tube 34. The hose nozzle head 41 may have a lever 39 for controlling the amount of water which flows into the tube 34 of the diatomaceous earth flex tube cleaner 30.

Alternatively, the diatomaceous earth flex tube cleaner 30 may be connected directly to an end of the water hose 40 through the fitting 38, eliminating the hose nozzle head 41. If the hose nozzle head 41 is not being used with the diatomaceous earth flex tube cleaner 30, the amount of water may be controlled by the user by folding or pinching the water hose line 40 during use.

Figure 8:
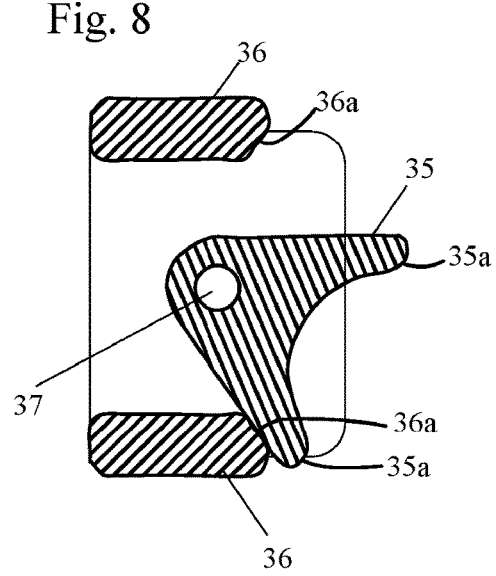
FIG. 8 shows a vibration valve for pulsating water and changing the pressure of the water as it cleans the diatomaceous earth flex tube.

In one embodiment, the first end 34a of the hollow tube 34 may also contain a vibration switch housing 36 with a vibration flow switch 35 rotatable about a pin 37. As water flows past the vibration flow switch, to provide water to clean the flex tube 10, the pressure of the water may be pulsates by having the water pass through the vibration switch housing 36. The water is pulsated as the water rotates the vibration flow switch 35 about a pin 37 and the ends 35a of the switch 35 rotate back and forth between end stops 36a of the vibration switch housing 36 as shown in FIG. 8.

Figure 9:
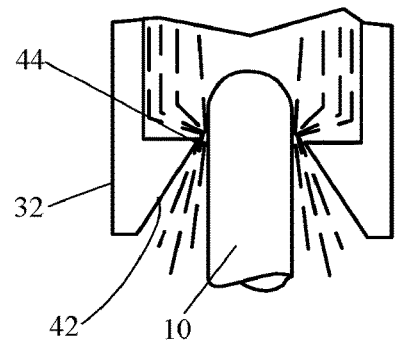
FIG. 9 shows a close-up cross-sectional view of the flex tube entering the blast jet housing.

The second end 34b of the tube 34 has a blast jet housing 32 with an inner diameter which has a water blast jet 31 and an ID brush 33. The blast jet housing 32 may have an angled lip 42 as shown in FIG. 9, to aid in self-centering a flex tube 10 for insertion into the tube 34 of the diatomaceous earth flex tube cleaner 30. It should be noted that since the inner diameter of the tube 34 is larger than the outer diameter of the flex tube 10, pressure builds up and blasts past a restricted orifice 44 formed by the angled lip 42 of the blast jet housing 32. The restricted orifice 44 accelerates the water (shown by the dashed lines) from the water hose 40 into a high pressure sprayer 360 degrees around the flex tube 10.

Figure 6:
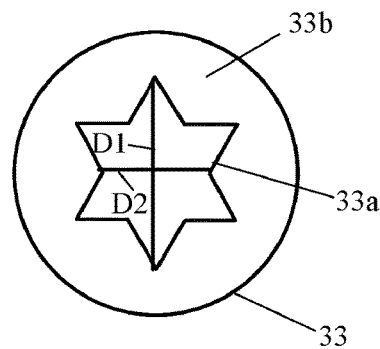
FIG. 6 shows an example of a shaped orifice of the ID brush.
Figure 7:
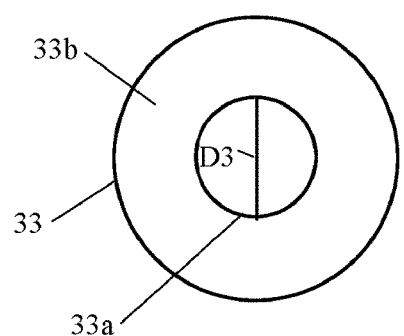
FIG. 7 shows another example of a shaped orifice of the ID brush.

The ID brush 33 is present along the entire inner circumference of the blast jet housing 32 and is used to scrub the surface of the diatomaceous earth flex tubes 10 and remove any material that may be stuck on the flex tubes 10. The orifice 33a formed by the ID brush 33 may have various shapes, for example a star shape as shown in FIG. 6 or a circle as shown in FIG. 7. The orifice 33a may have multiple diameters D1, D2 as shown in the star shape or a single diameter D3 as shown in the circle shape. The shape of the orifice 33a may aid in controlling the pressure of the water applied to the diatomaceous earth flex tubes 10 during cleaning. The ID brush 33 may have more than one ID brush 33 stacked together or be segmented creating a spiral brush along a length of the blast housing 32. The brushes may have bristles 33b and may be made of plastic. It should be noted that with the exception of the ID brush 33, the parts of the diatomaceous earth cleaner may all be injection molded, individually or together.

Figure 4:
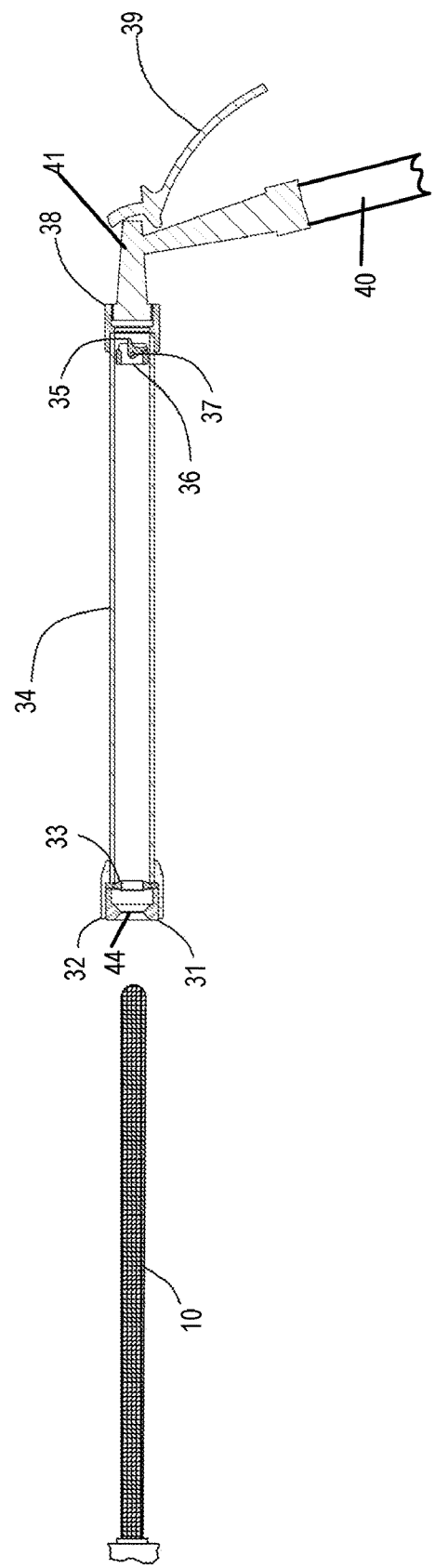
FIG. 4 shows the diatomaceous earth flex tube about to be inserted into the diatomaceous earth flex tube cleaner.
Figure 5:
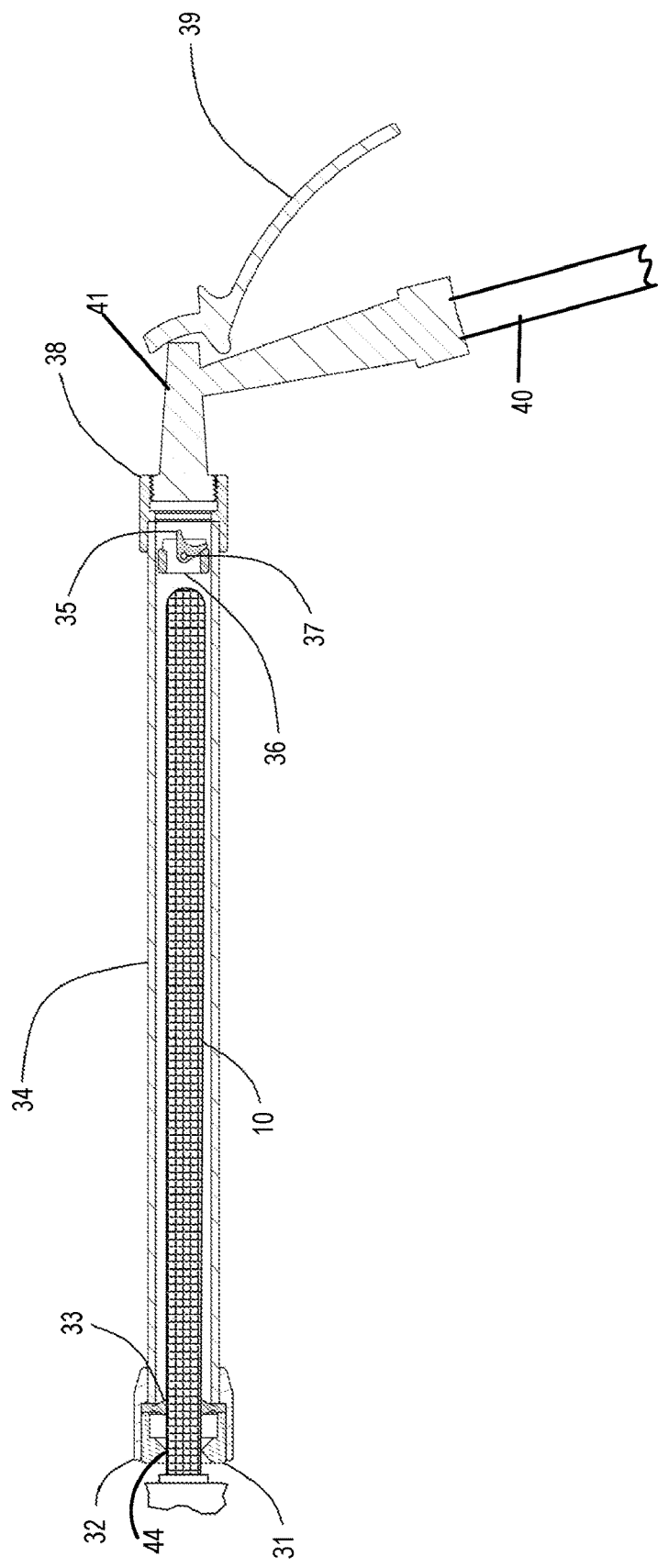
FIG. 5 shows the diatomaceous earth flex tube inserted into the diatomaceous earth cleaner.

FIG. 4 shows a flex tube 10 about to be inserted into the diatomaceous earth flex tube cleaner 30 and FIG. 5 shows the flex tube 10 fully inserted into the diatomaceous earth flex tube cleaner 30. Prior to inserting the flex tube 10 into the diatomaceous earth flex tube cleaner 30, water is provided to the diatomaceous earth flex tube cleaner 30 through the water hose 40 or the nozzle head 41. Once the leading edge or tip of the flex tube 10 is fully inserted into the diatomaceous earth flex tube cleaner 30, water can be applied for cleaning.

As the flex tube 10 enters the diatomaceous earth flex tube cleaner 30, the flex tube 10 is guided into a centered position by the angled lip 42 of the blast jet housing 32 and enters the restricted orifice 44 of the blast jet housing of the tube 34. Next, the ID brush 33 scrubs the outer circumference of the flex tubes 10 as the flex tube 10 continues to be inserted into the tube 34 of the diatomaceous earth flex tube cleaner 30. As the ID brush 33 scrubs the outer circumference of the flex tubes, water is blasting the flex tube 10 past the restricted orifice 44. Any built up water pressure squeezes past the restricted orifice 44 and the outside of the flex tube 10 present in the remaining portion of the tube 34, removing any debris collected along the full length of the flex tube 10. It should be noted that the diatomaceous earth flex tube cleaner 30 may be moved along the length of the flex tube multiple times to fully clean the flex tube 10. This process is then repeated for the remaining flex tubes 10 attached to the tube sheet 17.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A diatomaceous earth filter cleaner for cleaning flex tubes attached to a tube sheet of a diatomaceous earth filter, comprising:
    a hollow tube having a length with a first end and a second end for receiving a flex tube;
    a blast jet housing attached to the second end of the hollow tube, the blast jet housing having an inner circumference forming an angled lip defining a restricted orifice of the blast jet housing for receiving a flex tube;
    an inner diameter scrub brush received within the inner circumference of the blast jet housing having an orifice for cleaning an outer circumference of the flex tube; and
    a hose nozzle fitting at the first end of the hollow tube coupling a water supply to the hollow tube through a hose;
    wherein, when water is continuously supplied from the hose to the hollow tube containing a flex tube, the water continuously supplied and the inner diameter scrub brush clean the outer circumference of the flex tube.

2. The diatomaceous earth filter cleaner of claim 1, further comprising a vibration switch received within the first end of the hollow tube, the vibration switch comprising a vibration switch housing and a switch rotatably coupled to a pin and received within the vibration switch housing for rotating between a first stop and a second stop of the vibration switch housing.

3. The diatomaceous earth filter cleaner of claim 1, wherein the orifice of the inner diameter scrub brush is star shaped.

4. The diatomaceous earth filter cleaner of claim 1, wherein the orifice of the inner diameter scrub brush is circular.

5. The diatomaceous earth filter cleaner of claim 1, wherein the orifice of the inner diameter scrub brush has more than one diameter.

6. The diatomaceous earth filter cleaner of claim 1, wherein the inner diameter scrub brush comprises bristles extending around an entire inner circumference of the blast jet housing.

7. The diatomaceous earth filter cleaner of claim 1, wherein the angled lip of the blast jet housing centers the flex tube within the length of the hollow tube.

8. A diatomaceous earth filter cleaner for cleaning flex tubes attached to a tube sheet of a diatomaceous earth filter, comprising:
    a hollow tube having a length with a first end and a second end for receiving a flex tube;
    a blast jet housing attached to the second end of the hollow tube, the blast jet housing having an inner circumference forming an angled lip defining a restricted orifice of the blast jet housing for receiving a flex tube;
    an inner diameter scrub brush received within the inner circumference of the blast jet housing having an orifice for cleaning an outer circumference of the flex tube;
    a hose nozzle fitting at the first end of the hollow tube coupling a water supply to the hollow tube through a hose; and
    a vibration switch received within the first end of the hollow tube, the vibration switch comprising a vibration switch housing and a switch rotatably coupled to a pin and received within the vibration switch housing for rotating between a first stop and a second stop of the vibration switch housing;
    wherein, when water is continuously supplied from the hose to the hollow tube containing a flex tube, the water continuously supplied and the inner diameter scrub brush clean the outer circumference of the flex tube.

9. The diatomaceous earth filter cleaner of claim 8, wherein the orifice of the inner diameter scrub brush is star shaped.

10. The diatomaceous earth filter cleaner of claim 8, wherein the orifice of the inner diameter scrub brush is circular.

11. The diatomaceous earth filter cleaner of claim 8, wherein the orifice of the inner diameter scrub brush has more than one diameter.

12. The diatomaceous earth filter cleaner of claim 8, wherein the inner diameter scrub brush comprises bristles extending around an entire inner circumference of the blast jet housing.

13. The diatomaceous earth filter cleaner of claim 8, wherein the angled lip of the blast jet housing centers the flex tube within the length of the hollow tube.

\* \* \* \* \*